US011659444B1

(12) United States Patent
Xing

(10) Patent No.: US 11,659,444 B1
(45) Date of Patent: May 23, 2023

(54) BASE STATION MANAGEMENT OF END-TO-END NETWORK LATENCY

(71) Applicant: T-Mobile USA, Inc., Bellevue, WA (US)

(72) Inventor: Shuqing Xing, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 59 days.

(21) Appl. No.: 17/324,013

(22) Filed: May 18, 2021

Related U.S. Application Data

(60) Provisional application No. 63/027,281, filed on May 19, 2020, provisional application No. 63/027,277, filed on May 19, 2020.

(51) Int. Cl.
*H04W 28/08* (2023.01)
*H04W 24/08* (2009.01)
(Continued)

(52) U.S. Cl.
CPC ..... *H04W 28/0975* (2020.05); *H04L 43/0852* (2013.01); *H04W 24/02* (2013.01); *H04W 24/08* (2013.01); *H04W 28/0268* (2013.01)

(58) Field of Classification Search
CPC . H04W 28/0975; H04W 24/02; H04W 24/08; H04W 28/0268; H04L 43/0852
See application file for complete search history.

(56) References Cited

U.S. PATENT DOCUMENTS 10,149,193 B2   12/2018   Cui et al.
10,477,457 B2   11/2019   Park et al.
(Continued)

FOREIGN PATENT DOCUMENTS

EP          2816858 A1     12/2014
WO    WO2017035300 A1      3/2017
(Continued)

OTHER PUBLICATIONS

S2-189055, "New key issue and solution for the enhancement of PDB provision," Aug. 24, 2018, 3GPP.*
(Continued)

*Primary Examiner* — Jae Y Lee
(74) *Attorney, Agent, or Firm* — Lee & Hayes, P.C.

(57) ABSTRACT

A latency manager at a base station in a radio access network (RAN) can be configured to dynamically determine an end-to-end latency associated with an end-to-end connection for a UE that extends through the RAN, a transport network, and a core network. The latency manager can also dynamically determine whether the end-to-end latency meets an end-to-end latency goal associated with the end-to-end connection. If the end-to-end latency does not meet the end-to-end latency goal, the latency manager can cause the base station to dynamically adjust radio resources to lower a RAN latency associated with the end-to-end connection. Lowering the RAN latency can cause the overall end-to-end latency to be lowered and to meet the end-to-end latency goal. In some examples, the latency manager may also request that the transport network and/or the core network take actions to reduce latencies to reduce the end-to-end latency to meet the end-to-end latency goal.

20 Claims, 4 Drawing Sheets

(51) Int. Cl.
  *H04W 28/02*  (2009.01)
  *H04W 24/02*  (2009.01)
  *H04L 43/0852*  (2022.01)

(56) References Cited

U.S. PATENT DOCUMENTS

| | | | |
|---|---|---|---|
| 10,582,432 | B2 | 3/2020 | Park et al. |
| 10,616,934 | B2 | 4/2020 | Talebi Fard et al. |
| 10,681,589 | B1 | 6/2020 | Dowlatkhah et al. |
| 11,387,970 | B2 | 7/2022 | Loehr et al. |
| 2017/0079059 | A1 | 3/2017 | Li et al. |
| 2017/0135099 | A1 | 5/2017 | Song et al. |
| 2017/0339688 | A1 | 11/2017 | Singh et al. |
| 2018/0123878 | A1 | 5/2018 | Li et al. |
| 2018/0183551 | A1 | 6/2018 | Chou et al. |
| 2019/0246442 | A1 | 8/2019 | Park et al. |
| 2019/0253917 | A1* | 8/2019 | Dao .................. H04W 28/0268 |
| 2020/0044723 | A1 | 2/2020 | Cirik et al. |
| 2020/0245233 | A1 | 7/2020 | Qian et al. |
| 2021/0158151 | A1 | 5/2021 | Wang |
| 2021/0160153 | A1 | 5/2021 | Akman et al. |
| 2021/0298038 | A1 | 9/2021 | Kang et al. |
| 2021/0345300 | A1 | 11/2021 | Selvanesan et al. |
| 2021/0368379 | A1 | 11/2021 | Xing et al. |
| 2021/0368514 | A1 | 11/2021 | Xing |
| 2022/0070104 | A1* | 3/2022 | Luo ...................... H04L 47/283 |
| 2022/0078663 | A1* | 3/2022 | Luo .................. H04W 72/1263 |
| 2022/0078857 | A1* | 3/2022 | Kim ...................... H04W 76/10 |
| 2022/0131582 | A1 | 4/2022 | Park et al. |
| 2022/0167408 | A1 | 5/2022 | Lee et al. |
| 2022/0174766 | A1 | 6/2022 | Zhou et al. |
| 2022/0201556 | A1* | 6/2022 | Yang ..................... H04W 28/24 |
| 2022/0225292 | A1 | 7/2022 | Mohammad Soleymani et al. |

FOREIGN PATENT DOCUMENTS

| | | | |
|---|---|---|---|
| WO | WO2017074486 | A1 | 5/2017 |
| WO | WO2017097227 | A1 | 6/2017 |
| WO | WO2017172789 | A1 | 10/2017 |
| WO | WO2017177364 | A1 | 10/2017 |
| WO | WO2018121621 | A1 | 7/2018 |
| WO | WO2019152213 | A1 | 8/2019 |

OTHER PUBLICATIONS

3GPP, "Technical Specification Group Services and System Aspects; Release 15 Description; Summary of Rel-15 Work Items (Release 15)", vol. TSG SA, No. V0.6.0, Feb. 4, 2019, pp. 1-122.

Extended European Search Report dated Oct. 29, 2021 for European Patent Application No. 21173816.6, 12 pages.

Office Action for U.S. Appl. No. 17/096,799, dated Mar. 16, 2022, Xing, "Bandwidth Part Configuration for Network Slicing", 27 pages.

Office Action for U.S. Appl. No. 17/096,836, dated Apr. 20, 2022, Xing, "Base Station Radio Resource Management for Network Slices" 24 pages.

3GPP, "Management and orchestration; Concepts, use cases and requirements", Technical Specification (TS) 28.530, 3rd Generation Partnership Project, Oct. 2018, 32 pages.

3GPP, "NR: Physical channels and modulation", Technical Specification (TS) 38.211, 3rd Generation Partnership Project, Mar. 2019, 98 pages.

3GPP, "NR; NR and NG-RAN Overall description; Stage-2", Technical Specification (TS) 38.300, 3rd Generation Partnership Project, Jul. 2020, 150 pages.

3GPP, "NR; Physical layer procedures for data", Technical Specification (TS) 38.214, 3rd Generation Partnership Project, Jul. 2019, 95 pages.

3GPP, "NR; Physical layer procedures for control", Technical Specification (TS) 38.213, 3rd Generation Partnership Project, Jul. 2019, 110 pages.

3GPP, "Procedures for the 5G System", Technical Specification (TS) 28.502, 3rd Generation Partnership Project, Jun. 2018, 311 pages.

3GPP, "System architecture for the 5G System (5GS)", Technical Specification (TS) 23.501, 3rd Generation Partnership Project, Apr. 2019, 242 pages.

Office Action for U.S. Appl. No. 17/096,836, dated Oct. 4, 2022, Shuqing Xing, "Base Station Radio Resource Management for Network Slices", 23 pages.

* cited by examiner

BASE STATION MANAGEMENT OF END-TO-END NETWORK LATENCY

RELATED APPLICATIONS

This U.S. Patent application claims priority to provisional U.S. Patent Application No. 63/027,277, entitled "Real Time Radio Resource Management in Network Slicing," filed on May 19, 2020, and provisional U.S. Patent Application No. 63/027,281, entitled "Network Slicing Techniques," filed on May 19, 2020, both of which are incorporated herein by reference in their entirety.

BACKGROUND

In a telecommunication network, a user equipment (UE) can wirelessly connect to a base station or other access point of a radio access network (RAN). The RAN may be connected, via a transport network, to a core network of the telecommunication network. The core network may in turn be connected to the Internet and other data networks.

Accordingly, UEs may access services via the Internet or another data networks through end-to-end connections that extend from the UE through the RAN, the transport network, and the core network. For example, a smart phone can engage in a voice call based on a connection through the RAN, the transport network, and the core network to a telephony application server (TAS). Similarly, the smart phone can engage in a real-time gaming service based on a similar connection through the RAN, the transport network, and the core network to a gaming server.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
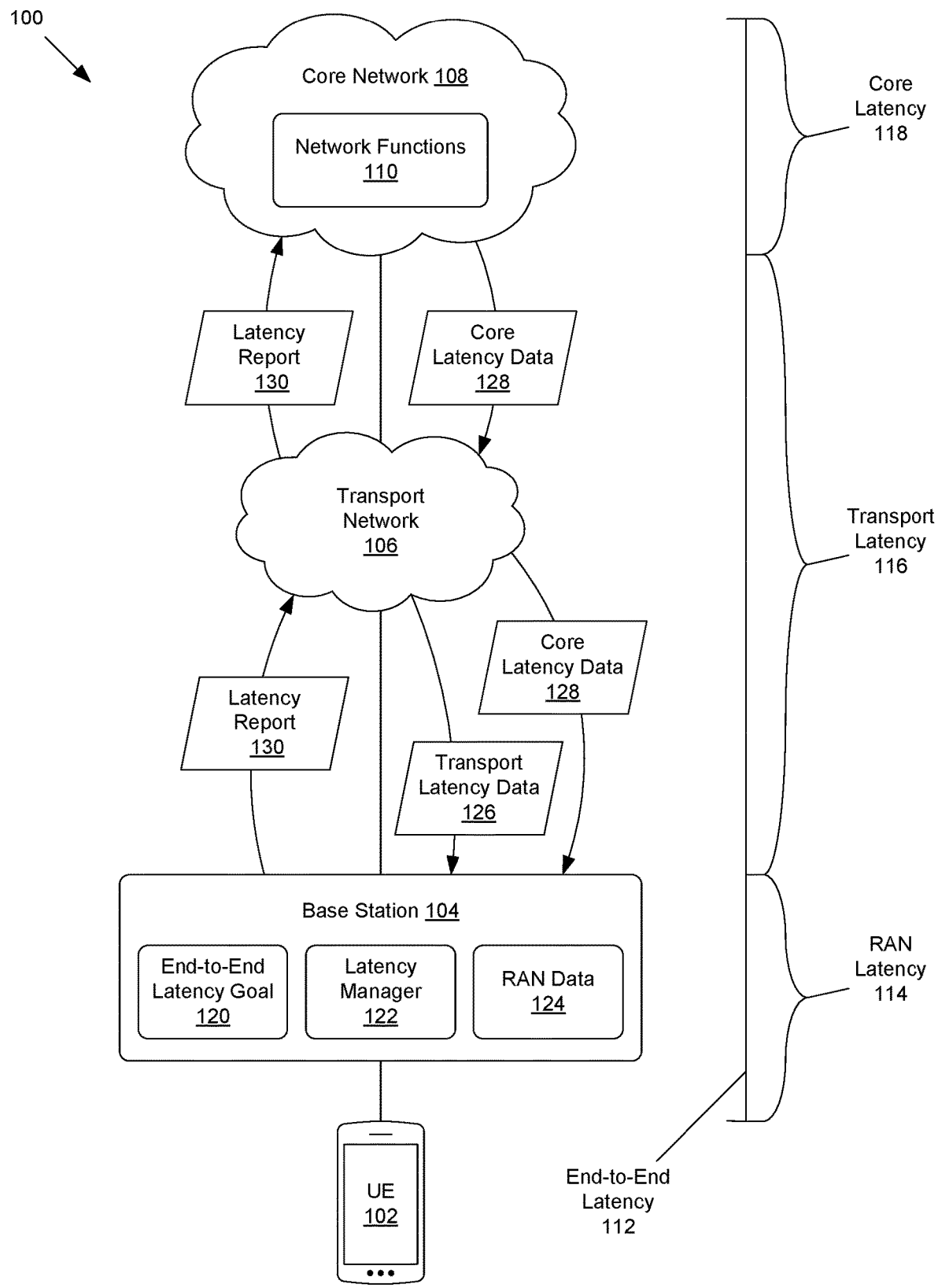
FIG. 1 shows an example network environment in which a UE can connect to a telecommunication network.

A user equipment (UE) may connect to a telecommunication network to engage in one or more services, such as voice calls, video calls, gaming services, streaming media services, and/or other types of services. In particular, the UE may engage in such services based on end-to-end connections that extend from the UE through a radio access network (RAN), a transport network, and a core network of the telecommunication network.

Each portion of an end-to-end connection for a UE may be associated with a latency value. Accordingly, an end-to-end latency associated with the end-to-end connection may be determined based on a sum of the latency values associated with individual portions of the end-to-end connection. For example, the end-to-end latency associated with the end-to-end connection may include at least a latency associated with the RAN, a latency associated with the transport network, and a latency associated with the core network.

Different services may be associated with different latency goals. For example, in a fifth generation (5G) telecommunication network, services may be categorized as Enhanced Mobile Broadband (eMBB) services, Massive Internet of Things (MIoT) services, or Ultra-Reliable Low Latency Communication (URLLC) services. URLLC services may be associated with lower latency goals than eMBB services or MIoT services. For instance, a real-time gaming service may be a URLLC service that has a relatively low latency goal, in order to avoid delays in data transmissions that may affect user experiences during gaming. However, streaming pre-recorded video may be an eMBB service that tolerates higher latencies than the real-time gaming service or other URLLC services.

In some examples, the transport network and/or core network may assign resources, and/or determine how to route data, for an end-to-end connection for a service based on latency goals associated with the service and/or a UE. For example, the core network can determine which network function instances should be associated with an end-to-end connection for a UE, based on which network function instances are available and may be most likely to meet the latency goals for the service and/or the UE.

Resources assigned to an end-to-end connection in the transport network and/or core network may, in some situations, be essentially fixed after the end-to-end connection has been initiated. Accordingly, changes in conditions may increase the latency values associated with the transport network and/or core network, and thereby increase the overall end-to-end latency associated with the end-to-end connection. For instance, if an end-to-end connection is associated with specific assigned elements in the core network, but those elements become overloaded with heavy traffic, the core network latency may increase and thereby also increase the overall end-to-end latency associated with the end-to-end connection. Such an increase in the overall end-to-end latency can negatively impact user experiences, particularly with respect to URLLC services or other services with relatively low latency goals.

Some RAN elements, such as base stations or other access points, may be configured to adjust settings to change latencies within the RAN itself. However, such RAN elements are generally not configured to change RAN latencies in order to keep an overall end-to-end latency at or below a target threshold latency. For instance, although a base station may be configured to adjust settings in order to keep a RAN latency value below a RAN latency target, the base station may not have information about latencies in the core network and/or the transport network. As such, the base station may not be able to determine that latencies in the core network and/or the transport network have increased, and that the overall end-to-end latency has increased. The base station may therefore maintain current settings in the RAN because the RAN portion of the connection is at or below a RAN target latency, even though the overall end-to-end latency has increased and may be causing a poor user experience for a user of the UE.

Additionally, in some examples, resources that are initially assigned to an end-to-end connection in the core network and/or the transport network may not be likely to meet latency goals associated with the core network and/or the transport network. For instance, if the core network is overloaded when a UE initiates a service, the core network may assign overloaded network elements to the UE such that the core network latency is likely to be above a latency target for the service. As discussed above, in many systems the RAN may not be provided with information about the core network latency. Accordingly, although the RAN may adjust settings so that the RAN latency for the service is itself at or below a target RAN latency, the RAN may not be able to determine that the overall end-to-end latency for the service is above an end-to-end latency goal and may be causing a poor user experience for a user of the UE.

The systems and methods described herein can enable a base station of the RAN to adjust the RAN portion of an overall end-to-end latency of an end-to-end connection for a UE, such that the overall end-to-end latency meets an end-to-end latency goal. For example, the base station may determine that latencies in the core network and/or transport network are relatively high. The base station can locally manage and dynamically adjust radio resources and/or other settings or attributes associated with the UE in real-time, in order to lower the latency of the RAN portion of the end-to-end connection and thereby compensate for high latencies in other portions of the overall end-to-end connection. Accordingly, by lowering the RAN latency, the base station may cause the overall end-to-end latency to be at or below an end-to-end latency goal even if latencies in the core network and/or the transport network are relatively high.

Example Environment

FIG. 1 shows an example network environment 100 in which a UE 102 can connect to a telecommunication network to engage in voice calls, video calls, messaging, data transfers, and/or any other type of communication or service. The UE 102 can be any device that can wirelessly connect to the telecommunication network. In some examples, the UE 102 can be a mobile phone, such as a smart phone or other cellular phone. In other examples, the UE 102 can be an Internet of Things (IoT) device, a personal digital assistant (PDA), a media player, a tablet computer, a gaming device, a smart watch, a hotspot, a personal computer (PC) such as a laptop, desktop, or workstation, or any other type of computing or communication device.

The telecommunication network can have a RAN that includes base stations and/or other access points to which the UE 102 can connect, such as the base station 104 shown in FIG. 1. In some examples, the RAN can be a virtual and/or open RAN, a cloud-based RAN, and/or a RAN or other type of access network that has any other type of structure or architecture.

The telecommunication network can also include, or be associated with, a transport network 106 and a core network 108. The transport network 106 can link the base station 104, and/or other elements of the RAN, to one or more elements of the core network 108. The transport network 106 can include fiber optic connections, microwave connections, and/or other types of backhaul data connections that connect the base station 104 and other RAN elements to the core network 108 directly or via one or more intermediate network elements. In some examples, the transport network 106 can be an alternative access vendor (AAV) network that is owned or operated by a different entity than the core network 108 and/or the RAN. In some examples, the telecommunication network may also have, or be associated with one or more edge computing elements (not shown). The edge computing elements may be part of the transport network 106, or be positioned between the base station 104 and the transport network 106, such that the edge computing elements can perform operations at positions that are closer to the base station 104 than the core network 108.

Overall, the UE 102 can wirelessly connect to the base station 104 in the RAN, and in turn be connected to the core network 108 via the base station 104 and the transport network 106. The core network 108 may also link the UE 102 to an Internet Protocol (IP) Multimedia Subsystem (IMS), the Internet, and/or other networks. For example, the core network 108 may link the UE 102, via the Internet, to a server for a website or service.

The UE 102, the base station 104, the RAN, and/or the core network 108 can be compatible with one or more radio access technologies, wireless access technologies, protocols, and/or standards. For example, elements of the UE 102, the base station 104, and/or the core network 108 can support, or be compatible with, 5G New Radio (NR) technology. In some examples, the elements of the UE 102, the base station 104, and/or the core network 108 may additionally, or alternately, support or be compatible with one or more other types of radio access technologies, such as Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

In some examples, the RAN can be a 5G access network, and the base station 104 can be a 5G base station known as a gNB. The core network 108 can, in some examples, also be based on 5G. For instance, the core network 108 can be a 5G core network (5GC). In other examples, the base station 104 and/or the core network 108 can be based on LTE technologies. For instance, the base station 104 may be an LTE eNB, and/or the core network 108 can be an LTE packet core network known as an Evolved Packet Core (EPC). In still other examples, the base station 104 can be any other type of base station or access point to which the UE 102 can connect, to in turn be linked to the core network 108 via the transport network 106.

The base station 104 and the UE 102 may support data transmissions at frequencies in one or more spectrum bands, such as low band frequencies under 1 GHz, mid-band frequencies between 1 GHz and 6 GHz, and/or high band frequencies above 6 GHz, including millimeter wave (mmW) frequencies above 24 GHz. As an example, a gNB may be configured to support one or more of the bands shown below in Table 1, and/or one or more other bands.

TABLE 1

Example Bands in 5G NR Spectrum

| Band | Shorthand Frequency (MHz) | Uplink Band (MHz) | Downlink Band (MHz) |
| --- | --- | --- | --- |
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |

TABLE 1-continued

Example Bands in 5G NR Spectrum

| Band | Shorthand Frequency (MHz) | Uplink Band (MHz) | Downlink Band (MHz) |
|---|---|---|---|
| n71 (Low Band) | 600 | 663-698 | 617-652 |
| n260 (mmW) | 39000 (39 GHz) | 37000-40000 | 37000-40000 |
| n261 (mmW) | 28000 (28 GHz) | 27500-28350 | 27500-28350 |

Figure 2:
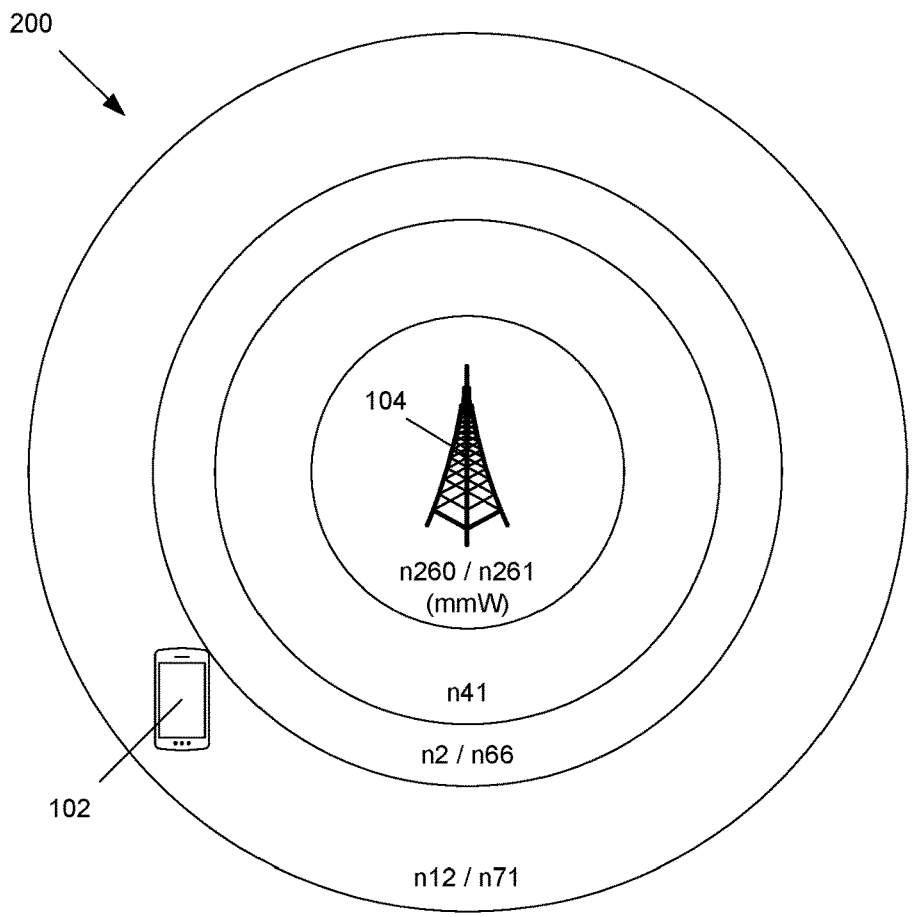
FIG. 2 shows an example of coverage areas associated with different spectrum bands.

Different spectrum bands may have different attributes and/or cover different geographical areas. For instance, FIG. 2 shows a non-limiting example 200 in which, in some situations, low bands may cover the largest geographical areas, mid-bands may cover smaller geographical areas than the low bands, and mmW bands and other high bands may cover smaller geographical areas than the low bands and/or mid-bands.

Additionally, different frequencies and spectrum bands may be associated with different metrics or characteristics, such as latency, throughput, reliability, supported bandwidths, and/or other metrics or characteristics. For example, in some situations mmW bands may be capable of providing higher throughput and/or lower latencies than mid-bands or low bands. As another example, low band frequencies may propagate farther and/or have better penetration than higher frequencies, such that low bands can be more accessible than mid-bands or high bands in some cases.

Figure 3:
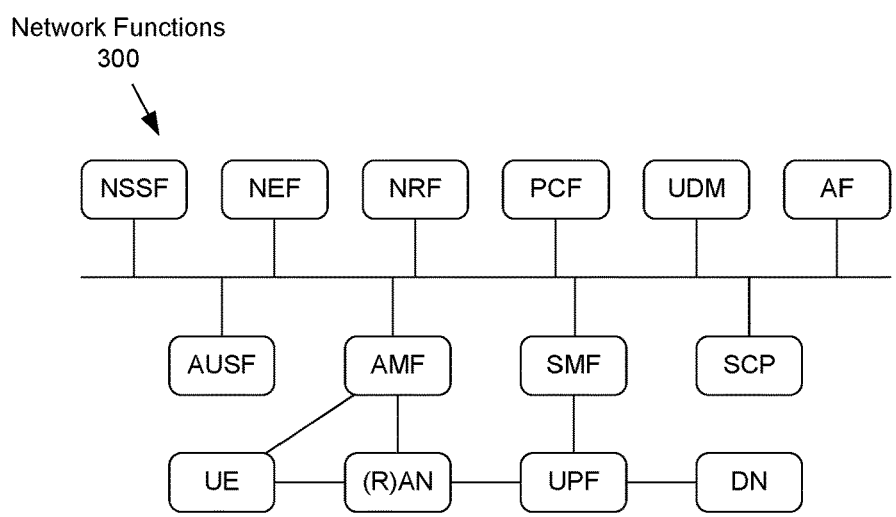
FIG. 3 shows an example service-based architecture for a 5G telecommunication network that includes multiple types of network functions.

In some examples, the telecommunication network can have a service-based system architecture in which different types of network functions operate alone and/or together to implement services. As a non-limiting example, FIG. 3 shows an example service-based architecture for a 5G telecommunication network that includes numerous types of network functions 300. For example, the telecommunication network can include network functions 300 such as an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP Inter-Working Function (N3IWF), Trusted Non-3GPP Gateway Function (TNGF), and Wireline Access Gateway Function (W-AGF), many of which are shown in the example of FIG. 3.

Returning to FIG. 1, some network functions 110 may execute in the core network 108, including one or more types of network functions 300 shown in FIG. 3. For example, a 5G core network can include one or more instances of an AMF, an SMF, a UPF, an AUSF, a PCF, an NSSF, and/or other network functions 110. In some examples, some network functions 110 may also, or alternately, execute at edge computing elements positioned between the base station 104 and the core network 108. In some examples, the UE 102 and/or the RAN, including the base station 104, may also be considered to be network functions 110 of the telecommunication network. Network functions 110 may be implemented using dedicated hardware, as software on dedicated hardware, and/or as virtualized functions on servers, cloud computing devices, or other computing devices.

The UE 102 may engage in one or more services via the telecommunication network, such as services for voice calls, video calls, gaming, streaming media, and/or other types of services or communications. For example, the UE 102 may communicate with a telephony application server (TAS) to place a call, communicate with a gaming server to engage in a cloud gaming session or a real-time multiplayer gaming session, and/or engage in any other type of service. In some examples, services that the UE 102 can engage in may be considered eMBB services, MIoT services, URLLC services, and/or other types or categories of services.

When the UE 102 engages in a service, an end-to-end connection for the service can be established through the telecommunication network. For example, if the UE 102 engages in a real-time gaming service in association with a remote gaming server, the real-time gaming service may use data transmitted over an end-to-end connection that extends from the UE 102 to the gaming server through the base station 104, the transport network 106, and the core network 108.

The UE 102 may, in some situations, engage in multiple services concurrently. For example, the UE 102 may engage in a voice call while also engaging in a web browsing session and/or downloading a file. In these examples, different services may be associated with different end-to-end connections.

In some examples, an end-to-end connection for a service can be associated with a Quality of Service (QoS) flow. For example, in a 5G network, a Protocol Data Unit (PDU) session may be established between the UE 102 and a UPF in the core network 108. The PDU session may be associated with an N3 tunnel that extends between the UPF and the base station 104 via the transport network 106, and one or more data radio bearers that extend between the base station 104 and the UE 102. The PDU session may also be associated with one or more QoS flows. Each QoS flow may extend between the UPF and the UE 102 via the N3 tunnel and one of the data radio bearers. Each QoS flow can be identified by a QoS Flow ID (QFI) value.

In some examples, different services associated with the UE 102 may be associated with the same QoS flow. In other examples, different services associated with the UE 102 may be associated with different QoS flows that are associated with the same PDU session and the same UPF instance in the core network 108. In still other examples, different services associated with the UE 102 may be associated with different QoS flows that are associated with different PDU sessions that extend from the UE 102 to different UPF instances in the core network 108.

In other examples, the telecommunication network may use network slicing techniques to assign different network slices to the same UE for different services and different end-to-end connections. For instance, if the UE 102 is engaging in two services concurrently, the telecommunication network may use a first network slice to transport traffic associated with a first service of the two services, and a second network slice to transport traffic associated with a second service of the two services. Each network slice can be a virtual and independent end-to-end logical network within the overall telecommunication network. End-to-end network slicing can create different network slices by allocating resources of the core network 108, the transport network 106, and/or the RAN to different network slices. End-to-end network slicing can thus include one or more of core network slicing, transport slicing, and RAN slicing. As an example, a full end-to-end network slice can be a Network Slice Instance (NSI), which may include subgroups of managed functions and resources associated with the core network 108, the transport network 106, and/or the RAN. For instance, an NSI can include a Network Slice Subnet Instance (NSSI) in the core network 108 and another NSSI in the RAN.

Network slicing can allow hardware resources, computing resources, radio resources, and/or other resources of the core network 108, the transport network 106, and/or the RAN to be shared among different network slices. For example, shared and/or different resources of hardware, transport links, and/or other network elements can be allocated to different network slices. Accordingly, relative to having distinct hardware, transport links, and/or other network elements for different end-to-end networks or connections, operational and capital expenses may be reduced due implementing different virtual networks via different network slices on shared hardware, transport links, and/or other network elements.

As shown in FIG. 1, an end-to-end connection for a service can be associated with an end-to-end latency 112. The end-to-end connection can be associated with a QoS flow, a network slice, or other type of connection, as discussed above. The end-to-end latency 112 for an end-to-end connection can include multiple components associated with latencies within different portions of the telecommunication network, including a RAN latency 114 associated with latency in the RAN, a transport latency 116 associated with latency in the transport network 106, and a core latency 118 associated with latency in the core network 108. Accordingly, the end-to-end latency 112 may be a sum or other combination of at least the RAN latency 114, the transport latency 116, and the core latency 118.

The end-to-end connection for a service can also be associated with an end-to-end latency goal 120. The end-to-end latency goal 120 may be associated with the particular service, a service type or categorization of the service, an identity of the UE 102, an identity of a user or subscriber associated with the UE 102, and/or any other attribute of the service or UE 102.

For example, the end-to-end latency goal 120 may be based on a categorization of the service as an eMBB service, an MIoT service, or a URLLC service. In these examples, URLLC services may be associated with relatively low end-to-end latency goals, while eMBB services and MIoT services may be associated with higher end-to-end latency goals.

As another example, the end-to-end latency goal 120 may instead, or additionally, be based on a Service Level Agreement (SLA) associated with the UE 102. For instance, an SLA may exist between a customer associated with the UE 102 and an operator of the telecommunication device. The SLA may define QoS levels associated with one or more types of services that the UE 102 may engage in via the telecommunication network. For example, for a particular service or type of service, an SLA may indicate a maximum latency value, a minimum throughput value, a target maximum drop call rate or other reliability goal, security goals or levels, and/or other goals or attributes that define QoS levels associated with the service or type of service. Accordingly, an SLA may indicate the end-to-end latency goal 120 for a particular service or type of service, and/or corresponding individual goals for the RAN latency 114, the transport latency 116, and the core latency 118.

As yet another example, the end-to-end latency goal 120 may instead, or additionally, be based on a 5G QoS Identifier (5QI) value, a QoS Class Identifier (QCI) value, a QoS profile, an application identifier, and/or other attributes associated with the service or end-to-end connection. For instance, as discussed above, the end-to-end connection for the service may be associated with a particular QoS Flow identified by a QFI value. The QFI value, and/or a corresponding QoS profile, may identify or correspond with a 5QI value that defines specific characteristics, such as a resource type, a priority level, a packet delay budget, and/or other characteristics. The resource type may, for example indicate that the service is a guaranteed bitrate (GBR) service, a delay critical GBR service, or a non-GBR service. In other examples, a QCI value or other information associated with the end-to-end connection can similarly indicate a resource type, a priority level, a packet delay budget, and/or other characteristics of the end-to-end connection. Similarly, an application identifier associated with a service may be included in a PDU service request sent by the UE 102 to initiate the end-to-end connection. The application identifier may correspond to a particular end-to-end latency goal.

In these examples, one or more of the characteristics associated with a 5QI value, QCI value, QoS profile, application identifier, or other information associated with the end-to-end connection may indicate the corresponding end-to-end latency goal 120 for the end-to-end connection. For instance, in some examples the end-to-end latency goal 120 may be based at least in part on a packet delay budget, indicated by a 5QI value associated with the end-to-end connection, which indicates a maximum data packet transmission time between the UE 102 and a UPF instance in the core network 108.

The base station 104 can have a latency manager 122 that is configured to determine the end-to-end latency goal 120 associated with an end-to-end connection for the UE 102. In some examples, the latency manager 122 may be configured to determine the end-to-end latency goal 120 based on a QoS profile, associated with the end-to-end connection, retrieved from an AMF or other network function in the core network 108. In other examples, the latency manager 122 may also, or alternately, be configured to determine the end-to-end latency goal 120 for the end-to-end connection based on a corresponding SLA, a corresponding 5GI value, a corresponding QCI value, a corresponding service category, and/or other corresponding data, as described above.

The latency manager 122 can also be configured to determine the current end-to-end latency 112 of the end-to-end connection, and to determine whether the current end-to-end latency 112 is at or below the end-to-end latency goal 120 associated with the end-to-end connection. The latency manager 122 can be further configured to dynamically manage and adjust radio resources and/or other attributes associated with connections between the base station 104 and the UE 102 and/or other UEs, based at least in part on whether the end-to-end latency 112 is at or below the end-to-end latency goal 120.

For example, if the latency manager 122 determines that the end-to-end latency 112 of the end-to-end connection is above the corresponding end-to-end latency goal 120, the latency manager 122 can be configured to cause the base station 104 to adjust attributes of the connection between the base station 104 and the UE 102 in an attempt to lower the RAN latency 114. The latency manager 122 may also, in some examples, adjust attributes of one or more other connections between the base station 104 and other UEs that may result in a reduction of the RAN latency 114 associated with the UE 102. Accordingly, even if the core network 108 and/or transport network 106 are unable to lower the core latency 118 and/or transport latency 116 associated with the end-to-end connection, the latency manager 122 may be able to cause the RAN latency 114 to be lowered such that the overall end-to-end latency 112 associated with the end-to-end connection meets the end-to-end latency goal 120.

The latency manager 122 may determine or obtain RAN data 124 that indicates attributes of connections between one or more UEs and the base station 104. The RAN data 124 may, for example, indicate a current number of UEs connected to the base station 104, which frequencies and/or spectrum bands the UEs are using to connect to the base station 104, subcarrier spacing values associated with connections between the base station 104 and the UEs, signal strength measurements and/or other information about local radio conditions measured by the UEs and/or the base station 104, latency and/or throughput measurements taken by the UEs and/or the base station 104 for uplink and downlink transmissions, reliability metrics, other user experience metrics, trends or comparisons of metrics over time, and/or other data associated with connections between the base station 104 and the UEs.

The RAN data 124 may also include other information about the base station 104 and/or connected UEs. For example, the RAN data 124 may indicate which types of radio technologies the base station 104 and/or the UE 102 supports. For example, the supported radio technology data 424 may indicate whether the base station 104 and/or the UE 102 supports dual connectivity (DC), carrier aggregation (CA), Multiple Input Multiple Output (MIMO), link adaptation, subcarrier spacing reselection, and/or other types radio technologies or techniques. The RAN data 124 may also indicate a load or utilization value indicating how many UEs are currently connected to the base station 104, relative to a maximum number of connections. The RAN data 124 may also indicate which spectrum bands and/or the UEs support. For instance, the RAN data 124 may indicate that the base station 104 supports the n71 low band and the n41 mid-band. The RAN data 124 may also indicate loading and/or usage levels associated with computing resources of the base station 104, such as information about memory usage, processor usage, and/or usage of other computing resources.

In some examples, the RAN data 124 may include latency measurements that directly indicate the RAN latency 114 associated with an end-to-end connection for the UE 102. For example, the RAN data 124 may include direct measurements of the RAN latency 114 reported by UEs and/or taken by the base station 104. The RAN latency 114 may include latency information associated with the base station 104 and/or other components of the RAN. In some examples, the RAN latency 114 may also include indications of latencies associated with an air interface and/or wireless connection between the base station 104 and the UE 102.

In other examples, the RAN data 124 may also, or alternately include information that the latency manager 122 can use to determine or estimate the RAN latency 114 of the end-to-end connection. For instance, the latency manager 122 may be configured to determine or estimate the RAN latency 114 based on an indication of which spectrum band the UE 102 is using to connect to the base station 104, reported signal strength measurements, and/or other information in the RAN data 124. As an example, the latency manager 122 may be configured to infer that the RAN latency 114 associated with a UE connected to the base station 104 via an mmW band is relatively low, based on relatively strong signal strength measurements associated with that connection. In some examples, the latency manager 122 may use a machine learning model, artificial intelligence, a rule-based model, and/or any other system to predict or estimate the RAN latency 114 based on UE information, base station information, signal strength information, loading information, current radio resource allocations, and/or other information in the RAN data 124.

The latency manager 122 may also receive transport latency data 126 reported by, and/or associated with, one or more elements of the transport network 106. One or more elements of the transport network 106 can provide the transport latency data 126 to the latency manager 122 on a periodic basis, on an occasional basis, on an on-demand basis, or on any other basis or schedule.

In some examples, the transport latency data 126 may indicate a measurement of the transport latency 116 associated with the end-to-end connection for the UE 102. In other examples, the transport latency data 126 may alternately, or additionally, include information about routing and/or network elements associated with the end-to-end connection within the transport network 106. For instance, the transport latency data 126 may identify specific fiber or microwave connections that have been allocated to the end-to-end connection, load or utilization levels of such connections, computing resources or capabilities of one or more edge computing elements associated with the end-to-end connection, an indication that the portion of the end-to-end connection that passes through the transport network is arranged in a star topology, a circle topology, or any other type of topology or arrangement.

In some examples, the latency manager 122 may use loading information, routing information, topology information, and/or other information in the transport latency data 126 to determine or estimate the transport latency 116 of the end-to-end connection. By way of a non-limiting example, the latency manager 122 may use a machine learning model, artificial intelligence, a rule-based model, and/or any other system to predict or estimate the transport latency 116 based on loading information, routing information, topology information, and/or other information reported in the transport latency data 126.

The latency manager 122 may also receive core latency data 128 reported by, and/or associated with, one or more elements of the core network 108. For example, a UPF and/or one or more other network functions 110, can act as a feedback mechanism in the core network 108 to determine the core latency data 128 and provide the core latency data 128 to the latency manager 122 at the base station 104. The core network 108 can provide the core latency data 128 to the latency manager 122 on a periodic basis, on an occasional basis, on an on-demand basis, or on any other basis or schedule.

In some examples, the core latency data 128 may indicate a measurement of the core latency 118 associated with the end-to-end connection for the UE 102. The core latency data 128 may alternately, or additionally, include information about routing and/or the network functions 110 associated with the end-to-end connection within the core network 108. For example, the core latency data 128 may identify individual network functions 110 associated with the end-to-end connection within the core network 108, and/or corresponding loading information such as data about current and/or historical utilization rates of the individual network functions 110, capacities of the individual network functions 110, and/or other loading information. As an example, if the end-to-end connection is associated with multiple network functions 110 in the core network, processing times and/or load conditions associated with multiple network functions 110 may contribute to the overall core latency 118.

The latency manager 122 may use loading information, routing information, and/or other information in the core latency data 128 to determine or estimate the core latency 118 of the end-to-end connection. As an example, a feedback mechanism, such as one or more of the network functions 110, of the core network 108 may be configured to measure or determine the core latency 118 associated with the end-to-end connection, such that the core network 108 can report a measurement of the core latency 118 to the latency manager 122 on a periodic basis, on an occasional basis, on an on-demand basis, or on any other basis or schedule. As another example, the core latency data 128 may include loading information associated with network functions 110 in the core network 108 that are associated with the end-to-end connection, and the latency manager 122 may be configured to determine that the core latency 118 has increased over a period of time if the core latency data 128 indicates that load levels associated with the network functions 110 have increased during that period of time. As yet another example, the latency manager 122 may use a machine learning model, artificial intelligence, a rule-based model, and/or any other system to predict or estimate the core latency 118 based on loading information, network function information, routing information, and/or other information reported in the core latency data 128.

Accordingly, overall the latency manager 122 can use the RAN data 124, the transport latency data 126, and/or the core latency data 128 to determine the RAN latency 114, the transport latency 116, and/or the core latency 118 associated with the end-to-end connection, and thereby determine the overall end-to-end latency 112 associated with the end-to-end connection. The latency manager 122 can also determine the end-to-end latency goal 120 associated with the end-to-end connection. For example, the latency manager 122 may determine the end-to-end latency goal 120 based on one or more types of information described above, such as an SLA associated with the UE 102 and/or service associated with the end-to-end connection, a type or category of the service, a 5QI value, QCI value, or other QoS information associated with the service and/or the end-to-end connection, and/or any other information.

The latency manager 122 can compare the end-to-end latency 112 against the end-to-end latency goal 120, to determine whether the end-to-end latency 112 is at or below the end-to-end latency goal 120, or is above the end-to-end latency goal 120. Depending on whether the end-to-end latency 112 is below, at, or above the end-to-end latency goal 120, the latency manager 122 may cause the base station 104 to dynamically adjust one or more attributes of the connection between the base station 104 and the UE 102, and/or other connections between the base station 104 and other UEs.

For example, if the latency manager 122 determines that the end-to-end latency 112 for the UE 102 is above the end-to-end latency goal 120, the latency manager 122 may cause the base station 104 to adjust radio resources assigned to the UE 102 such that the RAN latency 114 decreases and the overall end-to-end latency 112 meets the end-to-end latency goal 120. By way of a non-limiting example, the end-to-end latency goal 120 may indicate that the overall end-to-end latency 112 should be at or below 50 milliseconds (ms), the current end-to-end latency 112 may be 70 ms, and the current RAN latency 114 may be 30 ms. In this example, 40 ms of the 70 ms end-to-end latency may be associated with the core network 108 and/or the transport network 106, and the core network 108 and/or the transport network 106 may be unable to adjust routing schemes or network element selections to lower the core latency 118 or the transport latency 116. However, the latency manager 122 may cause the base station 104 to reallocate radio resources associated with the UE 102 such that the RAN latency 114 for the UE 102 decreases from 30 ms to under 10 ms. Accordingly, the decrease in the RAN latency 114, initiated by the latency manager 122, can cause the overall end-to-end latency 112 for the UE 102 to decrease from 70 ms to under the 50 ms end-to-end latency goal 120.

As another example, if the latency manager 122 determines that the end-to-end latency 112 for the UE 102 is below the end-to-end latency goal 120, the latency manager 122 may cause the base station 104 to adjust radio resources assigned to the UE 102 such that the RAN latency 114 increases, but the overall end-to-end latency 112 stays at or below the end-to-end latency goal 120. By way of a non-limiting example, if the end-to-end latency goal 120 indicates that the overall end-to-end latency 112 should be at or below 200 ms, and the current end-to-end latency 112 is 100 ms, the latency manager 122 may cause the base station 104 to reallocate radio resources such that the RAN latency 114 for the UE 102 increases and in turn raises the end-to-end latency 112 to 180 ms or another value that is at or below 200 ms. In this example, the end-to-end latency 112 can still meet the end-to-end latency goal 120 after the increase in the RAN latency 114, but the changes to resources allocated to the UE 102 by the base station 104 may free up those resources to be reallocated to one or more other UEs, and/or one or more other end-to-end connections associated with the same UE, that may be associated with end-to-end latencies that are currently above corresponding end-to-end latency goals. Accordingly, the latency manager 122 may cause the base station 104 to dynamically balance and adjust resources allocated to different UEs, and/or different end-to-end connections, such that end-to-end latency goals associated with the different UEs and/or different end-to-end connections can be met.

The latency manager 122 can cause the base station 104 to dynamically change one or more types of attributes of connections between the base station 104 and one or more UEs. As discussed above, such changes may increase or decrease RAN latencies associated with the connections, and in turn increase or decrease the overall end-to-end latencies associated with the connections. The latency manager 122 may, for example, attempt to change RAN latencies associated with one or more end-to-end connections by causing the base station 104 to locally adjust and/or re-allocate available radio resources associated with one or more connections between the base station 104 and one or more UEs, and/or steer traffic to different spectrum bands. The latency manager 122 may also dynamically change subcarrier spacing values associated with one or more of the connections, dynamically adjust performance load balancing between spectrum bands, dynamically adjust scheduling and/or resource assignment associated with one or more UEs, dynamically change attributes associated with the connections at one or more protocol layers, such as the physical layer, the Medium Access Control (MAC) layer, the Radio Link Control (RLC) layer, and/or the Packet Data Convergence Control (PDCP) layer, and/or take other actions to adjust RAN latencies associated with one or more connections.

As an example, the latency manager 122 may attempt to adjust the RAN latency 114 associated with an end-to-end connection for the UE 102 by changing a spectrum band, a combination of spectrum bands, and/or specific portions of spectrum that the UE 102 uses to connect to the base station 104 in association with that end-to-end connection. For instance, if the UE 102 is currently using a low band to connect to the base station 104, and the end-to-end latency 112 is above the end-to-end latency goal 120, the latency manager 122 may cause the base station 104 to instruct the UE 102 to change to using a high band to connect to the base station 104. Accordingly, because in some situations high bands may be associated with lower latencies than low bands, instructing the UE 102 to switch to from using a low band to using a high band may lower the RAN latency 114, and thereby lower the overall end-to-end latency 112.

In some examples, if the latency manager 122 causes the base station 104 to instruct the UE 102 to use a certain band, or a certain portion of spectrum, the latency manager 122 may also cause the base station 104 to move other UEs off that band or portion of spectrum. For instance, if the UE 102 is associated with an SLA that indicates that data for a particular service is to be transported with latency values under the end-to-end latency goal 120, and other UEs connected to the base station 104 are not associated with that SLA or similar SLAs, the latency manager 122 may cause the base station 104 to allocate a reserved portion of spectrum to the UE 102, and instruct other UEs to move to other non-reserved portions of spectrum. Accordingly, the UE 102 can use the reserved portion of spectrum to transport data for the service without interference or congestion associated with other UEs that might increase the RAN latency 114. In other examples, the latency manager 122 may perform load balancing operations to dynamically re-allocate frequencies and/or spectrum band assignments associated with a set of UEs, for instance such that the frequencies and/or spectrum band associated with the UE 102 becomes less congested and lowers the RAN latency 114 associated with the UE 102.

As another example, the latency manager 122 may attempt to adjust the RAN latency 114 associated with an end-to-end connection for the UE 102 by changing scheduling priorities at the base station 104. For example, if ten UEs are connected to the base station 104, and the UE 102 is associated with an SLA that defines the end-to-end latency goal 120, the latency manager 122 may attempt to manage the RAN latency 114 to keep the end-to-end latency 112 at or below the end-to-end latency goal 120 by configuring a scheduler of the base station 104 to prioritize transmission of traffic associated with the UE 102 over traffic associated with the other nine UEs.

As another example, the latency manager 122 may attempt to adjust the RAN latency 114 associated with an end-to-end connection for the UE 102 by changing subcarrier spacing values associated with the end-to-end connection. 5G transmissions can use orthogonal frequency-division multiplexing (OFDM), which can allow scalable subcarrier spacing in at least some bands. For instance, in 5G the subcarrier spacing can be set at different values including 15 kHz, 30 kHz, 60 kHz, 120 kHz, or 240 kHz. In some cases, using larger subcarrier spacing values can lead to smaller OFDM symbol durations, which can make transmissions less sensitive to phase noise and/or increase how frequently data can be transmitted. Larger subcarrier spacing values may therefore lead to lower latencies associated with data transmissions in some situations. Accordingly, the latency manager 122 may attempt to lower the RAN latency 114 of an end-to-end connection by changing the subcarrier spacing values used to transmit data from a lower value to a higher value.

As still another example, the latency manager 122 may adjust attributes of one or more network slices associated with end-to-end connections, in an attempt to adjust RAN latencies associated with the end-to-end connection. For instance, the base station 104 may allocate specific portions of spectrum, and/or other radio resources, to different network slices. Accordingly, the latency manager 122 may attempt to lower the RAN latency 114 associated with a first network slice by increasing the portion of spectrum allocated to the network slice, and decreasing the portion of spectrum allocated to a second network slice. Increasing the portion of spectrum allocated to the first network slice may, in some situations, decrease the RAN latency 114 associated with the first network slice, and accordingly decrease the overall end-to-end latency 112 associated with the first network slice.

In some examples, the latency manager 122 may also execute and/or assist with other radio resource management functions of the base station 104. For example, the base station 104 may perform radio resource management functions including admission control, load control, radio resource scheduling, and mobility management. Accordingly, the latency manager 122 may also perform, or assist with, admission control, load control, radio resource scheduling, mobility management, and other radio resource management functions with respect to different UEs and/or different end-to-end connections associated with one or more UEs. For example, an admission control system of the base station 104 may share information with the latency manager 122, such that the latency manager 122 can control assignment of end-to-end connections and/or UEs to certain spectrum bands or other radio resources. For instance, the latency manager 122 can assist with steering traffic during a handover operation from a current spectrum band to a different spectrum band when a UE is in a connected state, during a redirection operation via a system information block when a UE is in an idle state, and/or when a UE is in an inactive state. Accordingly, the latency manager 122 may attempt to lower the RAN latency 114 associated with the UE 102 by steering traffic of other UEs to spectrum bands that are not in use by the UE 102, thereby decreasing load on the spectrum band used by the UE 102 such that the RAN latency 114 may decrease.

In some examples, the latency manager 122 may also provide a latency report 130 to the transport network 106 and/or the core network 108. The latency report 130 may indicate the overall end-to-end latency 112 determined by the latency manager 122, the individual RAN latency 114, transport latency 116, and/or core latency 118 determined by the latency manager 122, and/or other information associated the end-to-end connection or the UE 102. The latency manager 122 may be configured to provide latency reports to the transport network 106 and/or the core network 108 on a periodic basis, on an occasional basis, or based on a trigger condition. For example, the latency manager 122 may be configured to provide latency reports to the transport network 106 and/or the core network 108 if the latency manager 122 determines that end-to-end latency 112 of the end-to-end connection is above the end-to-end latency goal 120.

For example, the latency manager 122 may transmit the latency report 130 to notify the transport network 106 that the end-to-end latency 112 is above the end-to-end latency goal 120, such that elements of the transport network 106 may attempt to re-route traffic associated the end-to-end connection within the transport network 106 to lower the transport latency 116. The latency manager 122 may also use the latency report 130 to instruct or request that the transport network 106 dynamically re-configure the portion of the end-to-end connection passing through the transport network 106 in an attempt to lower the transport latency 116.

Similarly, the latency manager 122 may transmit the latency report 130 to notify one or more network functions 110 of the core network 108 that the end-to-end latency 112 is above the end-to-end latency goal 120, such that the core network 108 may attempt to take actions to lower the core latency 118. The latency manager 122 may also use the latency report 130 to instruct or request that the core network 108 dynamically re-configure the portion of the end-to-end connection 112 passing through the core network 108 in an attempt to lower the core latency 118.

In some examples, if the latency manager 122 determines that the end-to-end latency 112 is not meeting the end-to-end latency goal 120, the latency manager 122 may initially attempt to lower the RAN latency 114 by causing the base station 104 to perform one more actions associated with the connection with the UE 102 and/or other UEs as described above. However, if the actions taken locally at the base station 104 do not cause the RAN latency 114 to be reduced such that the end-to-end latency 112 meets the end-to-end latency goal 120, the latency manager 122 may transmit a latency report 130 to the transport network 106 and/or the core network 108 that may prompt the transport network 106 and/or the core network 108 to take actions to reduce the transport latency 116 and/or the core latency 118 such that the overall end-to-end latency 112 meets the end-to-end latency goal 120.

As discussed above, the UE 102 may be associated with multiple end-to-end connections, for instance in association with different services. Each of the end-to-end connections may be associated with a different end-to-end latency and/or a different end-to-end latency goal. The latency manager 122 can cause the base station 104 to take actions to adjust the RAN latency 114 associated with each of the end-to-end connections independently. For example, if the UE 102 is using a URLLC service, the latency manager 122 may cause the base station 104 to change spectrum, bandwidth, and/or other attributes associated with the end-to-end connection for the URLLC service, to reduce the RAN latency 114 and cause the end-to-end latency 112 to meet the end-to-end latency goal 120 associated with the URLLC service. However, if the UE 102 is also using an eMBB service at the same time as the URLLC service, and the end-to-end latency goal 120 associated with the eMBB service is higher than the end-to-end latency goal 120 associated with the URLLC service, the latency manager 122 may determine that the current configuration is sufficient to keep the end-to-end latency 112 associated with the eMBB service at or below the end-to-end latency goal 120 for the eMBB service.

In some examples, the latency manager 122 can use machine learning models or other artificial intelligence systems, rule-based models, and/or self-organizing (SON) systems, to determine one or more of the RAN latency, the transport latency 116, or the core latency 118, and/or the overall end-to-end latency, as discussed above. The latency manager 122 can also, in some examples, use machine learning models, artificial intelligence systems, rule-based models, and/or SON systems to determine which actions to take to adjust the RAN latencies associated with one or more end-to-end connections. As discussed above, the latency manager 122 can cause the base station 104 to dynamically change spectrum bands, combinations of spectrum bands, allocated frequencies or portions of spectrum bands, sub-carrier spacing values, scheduling priorities, network slicing attributes, admission and load control policies, or protocol layer attributes, perform load balancing operations, and/or take other possible actions to adjust the RAN latencies associated with one or more end-to-end connections. In some examples, the latency manager 122 can use SON systems and/or machine learning or other artificial intelligence systems to generate, based on one or more input factors, a resource adjustment determination. The resource adjustment determination may be a prediction or indication of which of the possible actions may be most likely to adjust RAN latencies and cause the end-to-end latencies of one or more end-to-end connections to meet corresponding end-to-end latency goals.

For example, the latency manager 122 may evaluate RAN data 124, transport latency data 126, core latency data 128, end-to-end latency values, and/or other information associated with end-to-end connections using one or more machine learning algorithms, and predict which actions of the base station 104 are most likely to result in the end-to-end latency values meeting corresponding end-to-end latency goals. The machine learning algorithms may include convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

In some examples, machine learning or other artificial intelligence systems of the latency manager 122 can be trained on historical data, such as historical RAN data, historical transport latency data, historical core latency data, and/or historical end-to-end latency data for prior end-to-end connections associated with the base station 104 and/or other base stations. The historical data may also indicate actions taken by the base station 104, and/or other base stations, and how the actions affected the end-to-end latencies of the prior end-to-end connections. The training can include identifying which factors in the historical data indicate the RAN latency 114, the transport latency 116, and/or the core latency 118, and/or identifying how such factors can be combined to determine the end-to-end latency 112. The training can also include identifying which factors in the historical data correlate to end-to-end latencies meeting end-to-end latency goals, and/or in which situations or based on which actions taken by base stations. Accordingly, the latency manager 122 can use a trained machine learning model to evaluate new or current input factors in the RAN data 124, the transport latency data 126, the core latency data 128, and/or the end-to-end latency 112 associated with a current end-to-end connection to determine the end-to-end latency 112, and/or to determine which actions are predicted to have the greatest likelihood of adjusting the RAN latency 114 such that the end-to-end latency 112 meets the end-to-end latency goal 120.

In some examples, such new input factors and results of new changes can be added to a training data set in addition to the previous historical data, and the machine learning model can be continually, occasionally, or periodically re-trained based on the training data set as additional data about input factors and results of changes. For example, if over time a certain type of change results in a higher likelihood of the end-to-end latency 112 meeting the end-to-end latency goal 120 in a certain type of situation, the machine learning algorithm can be re-trained on that new data such that it is more likely to generate a similar resource adjustment determination that recommends similar actions in similar scenarios in the future.

Example Architecture

Figure 4:
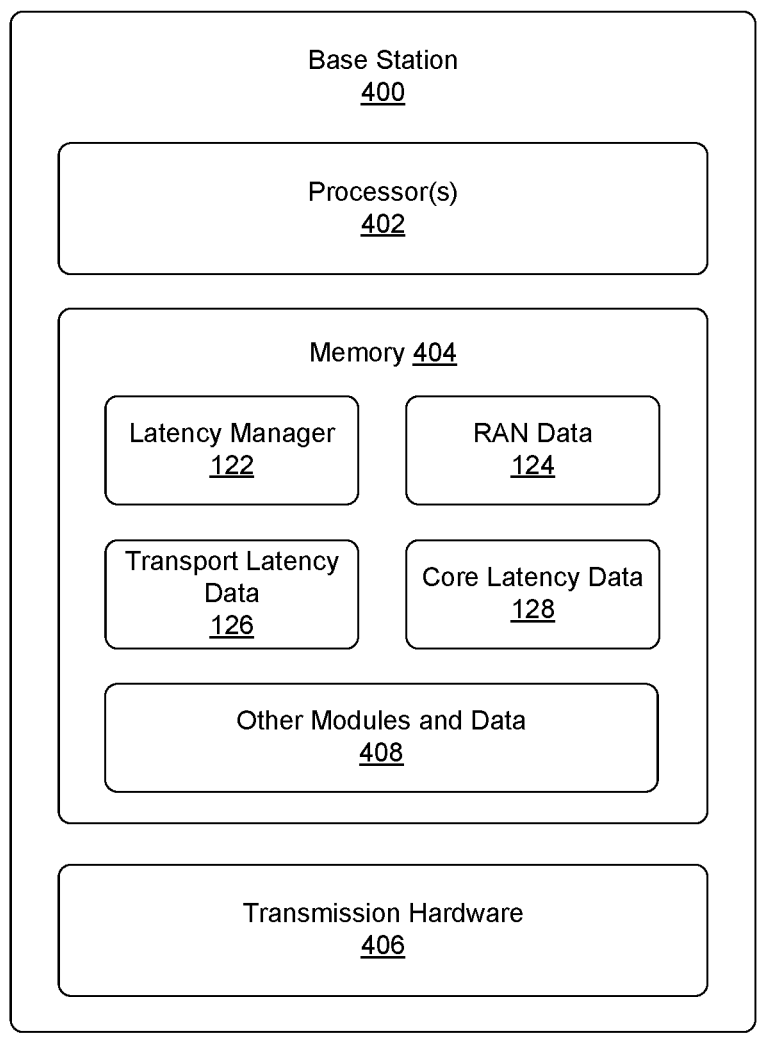
FIG. 4 shows an example system architecture for a base station.

FIG. 4 shows an example system architecture for a base station 400, in accordance with various examples. The base station 400 may be the base station 104 shown in FIG. 1. In some examples, the base station 400 can be a 5G base station, such as a gNB. In other examples, the base station 400 can be an LTE base station, such as an eNB. In still other example, the base station 400 can be compatible with any other type or generation of radio access technology. As shown, the base station 400 can include processor(s) 402, memory 404, and transmission hardware 406.

The processor(s) 402 may be a central processing unit (CPU) or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer-executable instructions and/or computer applications stored in the memory 404.

In various examples, the memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 400. Any such non-transitory computer-readable media may be part of the base station 400.

The memory 404 can store computer-readable instructions and/or other data associated with operations of the base station 400. For example, the memory 404 can store data for the latency manager 122, including computer-executable instructions for the latency manager 122, the RAN data 124, the transport latency data 126, the core latency data 128, and/or any other data associated with, or used by, the latency manager 122.

In some examples, the memory 404 may store computer-executable instructions for a SON system, a machine learning model, and/or an artificial intelligence system configured to evaluate the RAN data 124, the transport latency data 126, the core latency data 128, and determine a configuration to adjust radio resources associated with one or more UEs that increases the likelihood of end-to-end latency goals associated with one or more of the UEs being met. The memory 404 may also store a training data set used to train and/or retrain machine learning algorithms based on RAN data 124, transport latency data 126, and/or core latency data 128 collected over time, and/or historical results indicating how changes to radio resource allocations affected end-to-end latencies over time.

The memory 404 can further store other modules and data 408, which can be utilized by the base station 400 to perform or enable performing any action taken by the base station 400. The modules and data 408 can include a platform, operating system, firmware, and/or applications, and data utilized by the platform, operating system, firmware, and/or applications.

The transmission hardware 406 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs, other base stations, elements of the core network 108, and/or other network elements, and can transmit data over such connections. For example, the transmission hardware 406 can establish one or more connections with the UE 102 over air interfaces, and a connection with the core network 108 via the transport network 106. The transmission hardware 406 can also support transmissions using one or more radio access technologies, such as 5G NR or LTE, as discussed above. The transmission hardware 406 may also support one or more spectrum bands, such as low bands, mid-bands, and/or high bands. The transmission hardware 406 may be configured to adjust or manage radio resources associated with end-to-end connections for one or more UEs, based on determinations by the latency manager 122 described herein.

Example Operations

Figure 5:
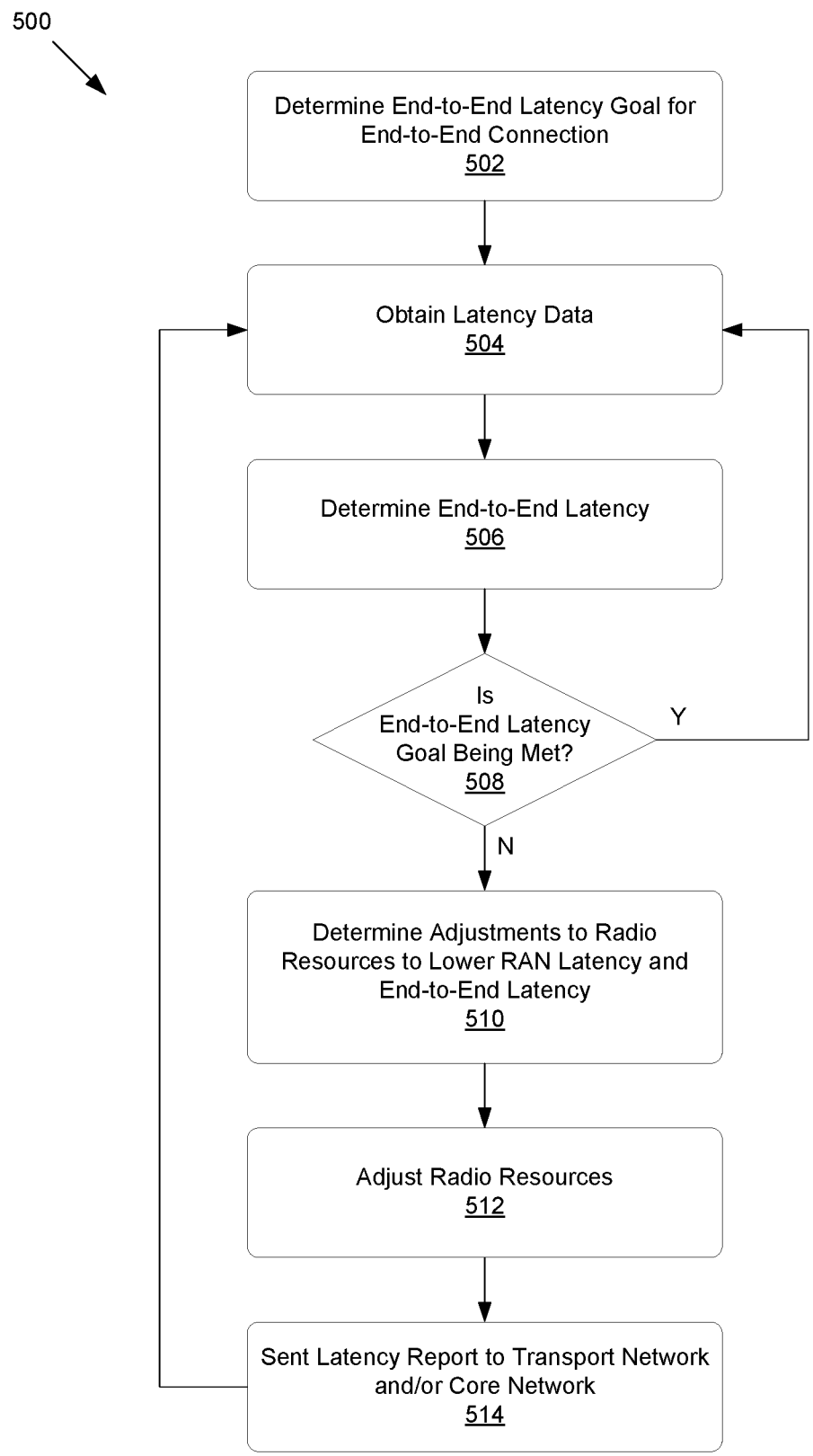
FIG. 5 shows a flowchart of an example method that a latency manager at a base station can use to determine how to adjust radio resources associated with an end-to-end connection, in order to adjust a RAN latency and cause an end-to-end latency to meet an end-to-end latency goal.

FIG. 5 shows a flowchart of an example method 500 that the latency manager 122 at the base station 104 can use to determine how to adjust radio resources associated with an end-to-end connection, in order to adjust the RAN latency 114 and cause the end-to-end latency 112 to meet the end-to-end latency goal 120. The end-to-end connection can be a QoS flow, a network slice, or other type of connection that extends from the UE 102 through the base station 104 and the transport network 106 at least to the core network 108, as discussed above. The end-to-end connection may also be associated with one or more services being used by the UE 102.

At block 502, the latency manager 122 can determine the end-to-end latency goal 120 associated with the end-to-end connection. In some examples, the latency manager 122 can determine an SLA associated with the UE 102 and/or a service associated with the end-to-end connection, which may indicate the end-to-end latency goal 120. In other examples, the latency manager 122 may additionally, or alternately, determine the end-to-end latency goal 120 based on a 5QI value, a QCI value, a QoS profile, an application identifier, service category, and/or other attributes associated with the service or the end-to-end connection. As an example, if the end-to-end connection is a QoS Flow identified by a QFI value, an AMF in the core network 108 may provide the base station 104 with a QoS profile associated with the QoS Flow. The QoS profile may include a 5QI value and/or other parameters or characteristics that indicate the end-to-end latency goal 120 for the end-to-end connection.

At block 504, the latency manager 122 can obtain latency data, including the RAN data 124, the transport latency data 126, and/or the core latency data 128. For example, as discussed above the core network 108 may have a feedback mechanism, such as one or more of the network functions 110, that is configured to determine the core latency data 128 and provide the core latency data 128 to the latency manager 122 at the base station 104 on a periodic, occasional, or on-demand basis. The latency manager 122 can similarly obtain the transport latency data 126 from one or more elements of the transport network 106. The latency manager 122 can also determine the RAN data 124, or obtain the RAN data from other elements of the base station 104.

At block 506, the latency manager 122 can determine the end-to-end latency 112 associated with the end-to-end connection based on the latency data obtained at block 504. For example, the latency manager 122 can use the latency data obtained at block 504 to determine the RAN latency 114, the transport latency 116, and the core latency 118 associated with the end-to-end connection. The latency manager 122 can accordingly add, or otherwise combine, the RAN latency 114, the transport latency 116, and the core latency 118 to determine the overall end-to-end latency 112 associated with the end-to-end connection.

At block 508, the latency manager 122 can determine whether the end-to-end latency goal 120 determined at block 502 is being met by the end-to-end latency 112 determined at block 506. If the latency manager 122 determines that the current end-to-end latency 112 is meeting the end-to-end latency goal 120 (Block 508—Yes), the latency manager 122 can return to block 504 can obtain new or updated latency data, such that the latency manager 122 can use the new or updated latency data to determine an updated end-to-end latency at block 506 and determine whether the updated end-to-end latency meets the end-to-end latency goal 120 at block 508. Accordingly, as the end-to-end latency 112 of the end-to-end connection changes over time due to changes in conditions in the RAN, the transport network 106, and/or the core network 108, the latency manager 122 can dynamically determine whether the current end-to-end latency of the end-to-end connection meets the end-to-end latency goal 120. In some examples, the latency manager 122 can dynamically determine whether the current end-to-end latency of the end-to-end connection meets the end-to-end latency goal 120 substantially in real-time as conditions change in the telecommunication network and new RAN data 124, new transport latency data 126, and/or new core latency data 128 is obtained by the latency manager 122.

If the latency manager 122 determines that the current end-to-end latency 112 of the end-to-end connection does not meet the end-to-end latency goal 120 for the end-to-end connection (Block 508— No), at block 510 the latency manager 122 can determine adjustments to radio resources that may lower the RAN latency 114 and thereby lower the overall end-to-end latency 112. For example, the latency manager 122 may determine from RAN data 124 that the UE 102 is in a location served by a high band, and that switching the UE 102 from using a low band or a medium band to connect to the base station 104 to using the high band may be likely to decrease the RAN latency 114. As another example, the latency manager 122 may determine that shifting the UE 102 from using a current spectrum band or frequency range to a different spectrum band or specific frequency range that is less congested may reduce the RAN latency 114. In still other examples, the latency manager 122 may determine that changing a subcarrier spacing value associated with the end-to-end connection, adjusting a spectrum assignment for a network slice associated with the end-to-end connection, performing load balancing and/or steering actions to move other UEs to other spectrum bands or frequency ranges, changing scheduling priorities at the base station 104, adjusting admission control policies, changing protocol layer attributes, and/or other actions associated with the UE 102 and/or other UEs may reduce the RAN latency 114 associated with the end-to-end connection.

In some examples, the latency manager 122 may use a SON system, a rule-based system, or a machine learning system or other artificial intelligence system to generate a resource adjustment determination at block 510. The resource adjustment determination may indicate one or more actions that, based on the current situation indicated by the latency data obtained at block 504 and/or the end-to-end latency 112 determined at block 506, may be most likely to reduce the RAN latency 114 such that the end-to-end latency 112 meets the end-to-end latency goal 120.

At block 512, the latency manager 122 can cause the base station 104 to perform one or more operations to adjust the radio resources associated with the UE 102 and/or other UEs based on the determination made at block 510. In some examples, the latency manager 122 may also send a latency report to the transport network 106 and/or the core network 108 that indicates that the end-to-end latency 112 determined at block 506 was above the end-to-end latency goal 120, such that the transport network 106 and/or the core network 108 may attempt to reduce the transport latency 116 and/or the core latency 118 in response to the latency report.

After the radio resources are adjusted at block 512 and/or the latency report is sent to one or both of the transport network 106 and the core network 108 at block 514, the latency manager 122 can return to block 504 can obtain new or updated latency data. Accordingly, the latency manager 122 can use the new or updated latency data to determine an updated end-to-end latency at block 506, and determine whether the updated end-to-end latency meets the end-to-end latency goal 120 at block 508. For example, if the adjustments to the radio resources made at block 512 did not sufficiently reduce the RAN latency 114 to cause the overall end-to-end latency 112 to meet the end-to-end latency goal 120, the latency manager 122 may determine and implement additional radio resource adjustments at block 510 and block 512. Similarly, if the adjustments to the radio resources made at block 512 did not sufficiently reduce the RAN latency 114 to cause the overall end-to-end latency 112 to meet the end-to-end latency goal 120, the latency manager 122 send new latency reports at block 514 that request that the transport network 106 and/or core network 108 take actions to reduce the transport latency 116 and/or core latency 118 such that the overall end-to-end latency 112 meets the end-to-end latency goal 120.

In some examples, the latency manager 122 may use the process shown in FIG. 5 with respect to multiple end-to-end connections associated with the same UE and/or different UEs, substantially in parallel. For example, the latency manager 122 may determine that the end-to-end latency goal associated with a first end-to-end connection is currently being met, but that another end-to-end latency goal associated with a second end-to-end connection is not currently being met. In this example, the latency manager 122 may determine that spectrum assignments or other radio resources associated with the first end-to-end connection and the second end-to-end connection can be changed to increase the RAN latency associated with the first end-to-end connection and lower the RAN latency associated with the second end-to-end connection, such that the end-to-end latency goals for both end-to-end connections can be met.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by one or more processors of a base station in a radio access network (RAN), an end-to-end latency goal associated with an end-to-end connection that extends from a user equipment (UE) through the base station to a core network;
   determining, by the one or more processors, an end-to-end latency associated with the end-to-end connection, based at least in part on:
      a RAN latency associated with a RAN portion of the end-to-end connection in the RAN, and
      a core latency associated with a core network portion of the end-to-end connection in the core network;
   determining, by the one or more processors, that the end-to-end latency is above the end-to-end latency goal; and
   adjusting, by the one or more processors, and in response to determining that the end-to-end latency is above the end-to-end latency goal, radio resources associated with a connection between the base station and the UE,
   wherein adjusting the radio resources lowers the RAN latency and, by lowering the RAN latency, lowers the end-to-end latency to a level based on the end-to-end latency goal.

2. The method of claim 1, further comprising determining, by the one or more processors, the core latency based on core latency data received by the base station from the core network.

3. The method of claim 1, wherein determining the end-to-end latency is based further on a transport latency associated with a transport network portion of the end-to-end connection in a transport network that connects the base station to the core network.

4. The method of claim 1, wherein the end-to-end connection is a Quality of Service (QoS) flow, and the end-to-end latency goal is determined based on one or more of a 5G QoS Identifier (5QI) value or a QoS profile associated with the QoS flow.

5. The method of claim 1, wherein the end-to-end connection is associated with a Service Level Agreement (SLA), and the SLA defines the end-to-end latency goal.

6. The method of claim 1, wherein the end-to-end connection is associated with a network slice, and the radio resources are associated with the network slice.

7. The method of claim 6, wherein adjusting the radio resources comprises adjusting the radio resources associated with the network slice and other radio resources associated with one or more other network slices.

8. The method of claim 1, wherein adjusting the radio resources comprises performing one or more of:
   adjusting a spectrum band or frequency range associated with the connection,
   balancing loads on the spectrum band or the frequency range by shifting one or more other UEs to one or more different spectrum bands or frequency ranges,
   adjusting a subcarrier spacing associated with the connection,
   adjusting one or more protocol layer attributes associated with the connection, or
   adjusting a scheduling priority associated with the UE at the base station, relative to scheduling priorities associated with the one or more other UEs.

9. The method of claim 1, further comprising:
   generating, by the one or more processors and using a machine learning model, a resource adjustment determination based on one or more of: a current allocation of the radio resources associated with the connection, the RAN latency, the core latency, and the end-to-end latency goal, wherein the resource adjustment determination is a prediction of radio resource adjustments in the RAN that are likely to lower the end-to-end latency to being at or below the end-to-end latency goal; and
   adjusting, by the one or more processors, the radio resources based on the resource adjustment determination.

10. The method of claim 1, further comprising sending, by the one or more processors, a latency report to at least one of the core network or a transport network, wherein the latency report indicates that that the end-to-end latency is above the end-to-end latency goal and requests that that the core network or the transport network reduce the core latency or a transport latency associated with the transport network.

11. A base station of a radio access network (RAN), comprising:
   one or more processors;
   memory storing computer-executable instructions that, when executed by the one or more processors, cause the one or more processors to perform operations comprising:
      determining an end-to-end latency goal associated with an end-to-end connection that extends from a user equipment (UE) through the base station to a core network;
      determining an end-to-end latency associated with the end-to-end connection, based at least in part on:
         a RAN latency associated with a RAN portion of the end-to-end connection in the RAN, and
         a core latency associated with a core network portion of the end-to-end connection in the core network;
      determining that the end-to-end latency is above the end-to-end latency goal; and
      adjusting, in response to determining that the end-to-end latency is above the end-to-end latency goal, radio resources associated with a connection between the base station and the UE,
   wherein adjusting the radio resources lowers the RAN latency and, by lowering the RAN latency, lowers the end-to-end latency to a level based on the end-to-end latency goal.

12. The base station of claim 11, wherein the operations further comprise determining the core latency based on core latency data received by the base station from the core network.

13. The base station of claim 11, wherein the end-to-end latency goal is determined based on one or more of a 5G Quality of Service (QoS) Identifier (5QI) value, a QoS Class Identifier (QCI) value, a QoS profile, a Service Level Agreement (SLA), or an application identifier associated with the end-to-end connection.

14. The base station of claim 11, wherein the end-to-end connection is associated with a network slice, and the radio resources are associated with the network slice.

15. The base station of claim 11, wherein adjusting the radio resources comprises performing one or more of:
   adjusting a spectrum band or frequency range associated with the connection, balancing loads on the spectrum band or the frequency range by shifting one or more other UEs to one or more different spectrum bands or frequency ranges, adjusting a subcarrier spacing associated with the connection, adjusting one or more protocol layer attributes associated with the connection, or adjusting a scheduling priority associated with the UE at the base station, relative to scheduling priorities associated with the one or more other UEs.

16. The base station of claim 11, wherein the operations further comprise:

generating, using a machine learning model, a resource adjustment determination based on one or more of: a current allocation of the radio resources associated with the connection, the RAN latency, the core latency, and the end-to-end latency goal, wherein the resource adjustment determination is a prediction of radio resource adjustments in the RAN that are likely to lower the end-to-end latency to being at or below the end-to-end latency goal; and adjusting the radio resources based on the resource adjustment determination.

17. One or more non-transitory computer-readable media storing computer-executable instructions that, when executed by one or more processors of a base station of a radio access network (RAN), cause the one or more processors to perform operations comprising:

determining an end-to-end latency goal associated with an end-to-end connection that extends from a user equipment (UE) through the base station to a core network;

determining an end-to-end latency associated with the end-to-end connection, based at least in part on:

a RAN latency associated with a RAN portion of the end-to-end connection in the RAN, and a core latency associated with a core network portion of the end-to-end connection in the core network;

determining that the end-to-end latency is above the end-to-end latency goal; and adjusting, in response to determining that the end-to-end latency is above the end-to-end latency goal, radio resources associated with a connection between the base station and the UE, wherein adjusting the radio resources lowers the RAN latency and, by lowering the RAN latency, lowers the end-to-end latency to a level based on the end-to-end latency goal.

18. The one or more non-transitory computer-readable media of claim 17, wherein the end-to-end latency goal is determined based on one or more of a 5G Quality of Service (QoS) Identifier (5QI) value, a QoS Class Identifier (QCI) value, a QoS profile, a Service Level Agreement (SLA), or an application identifier associated with the end-to-end connection.

19. The one or more non-transitory computer-readable media of claim 17, wherein the end-to-end connection is associated with a network slice, and the radio resources are associated with the network slice.

20. The one or more non-transitory computer-readable media of claim 17, wherein adjusting the radio resources comprises performing one or more of:

adjusting a spectrum band or frequency range associated with the connection, balancing loads on the spectrum band or the frequency range by shifting one or more other UEs to one or more different spectrum bands or frequency ranges, adjusting a subcarrier spacing associated with the connection, adjusting one or more protocol layer attributes associated with the connection, or adjusting a scheduling priority associated with the UE at the base station, relative to scheduling priorities associated with the one or more other UEs.

\* \* \* \* \*